Dec. 2, 1969    R. S. MUELLER ET AL    3,481,422
SPEED CONTROL APPARATUS FOR AN AUTOMOTIVE VEHICLE
Filed Jan. 16, 1967    2 Sheets-Sheet 2

INVENTORS
ROBERT S. MUELLER
MARTIN W. UITVLUGT
BY
Yount, Raney, Flynn and Tarolli
ATTORNEYS

United States Patent Office 3,481,422
Patented Dec. 2, 1969

3,481,422
SPEED CONTROL APPARATUS FOR AN AUTOMOTIVE VEHICLE
Robert S. Mueller, Southfield, and Martin W. Uitvlugt, Battle Creek, Mich., assignors to Eaton Yale & Towne Inc., Cleveland, Ohio, a corporation of Ohio
Filed Jan. 16, 1967, Ser. No. 609,575
Int. Cl. F02d *11/10;* H01h *9/00;* B60k *27/00*
U.S. Cl. 180—108       13 Claims

ABSTRACT OF THE DISCLOSURE

A speed control apparatus for an automotive vehicle is provided and which includes an electrically actuatable speed governor unit for controlling the position of an engine throttle member to control the speed of the vehicle and switch means mounted on the turn signal lever of the vehicle for controlling actuation and deactuation of the speed governor unit.

---

The present invention relates to a control apparatus, and more particularly to a speed control apparatus for an automotive vehicle and which includes an electrically actuatable speed governor unit for controlling the position of an engine throttle member to control the speed of the vehicle and manually operable switch means for controlling the actuation of the speed governor unit.

An important object of the present invention is to provide a new and improved speed control apparatus of the character described above and wherein the switch means is mounted on the turn signal lever of the automotive vehicle and in a manner such that it can be readily manually operated by the operator and without the operator taking his eyes off the road.

Another object of the present invention is to provide a new and improved speed control apparatus, as defined in the next preceding object, and wherein the turn signal lever is a hollow member, and wherein electrical conductors connected with the switch means mounted on the turn signal lever and the speed governor unit extend through the hollow turn signal lever.

Yet another object of the present invention is to provide a new and improved speed control apparatus of the character described above, and wherein the speed governor unit includes a first electrical control means for actuating the speed governor unit to maintain the speed of the vehicle at a desired value and a second electrical control means for rendering the speed governor unit effective and ineffective to control the vehicle speed, and wherein actuation of the first and second control means are controlled by switches mounted on the turn signal lever of the vehicle.

A further object of the present invention is to provide a new and improved speed control apparatus, as defined in the next preceding object, and wherein one of the switches is a push button switch mounted on the free end of the turn signal level and wherein the other of the switches is a rotary switch having a mobile contact carried by a collar rotatably mounted on the turn signal lever.

A still further object of the present invention is to provide a new and improved apparatus for controlling actuation of a pair of electrical control means of an automotive vehicle, and which apparatus includes a hollow turn signal lever which is adapted to be mounted on the steering column of the vehicle and a pair of switch means mounted on the turn signal lever and in a manner such that they can be readily manually operated by the operator of the vehicle.

Another object of the present invention is to provide a new and improved apparatus for controlling actuation of an electrical control device and which comprises a hollow support member carrying a pair of fixed switch contacts which are connectable in an electric circuit with the device by electrical conductors extending through the hollow support member and a mobile arcuately extending contact carried by a collar rotatably supported on the support and which is rotatable to selectively engage and disengage the mobile contact with one of the fixed contacts to control the actuation of the electrical device.

The present invention further resides in various novel constructions and arrangements of parts, and further objects and advantages of the present invention will be apparent to those skilled in the art to which it relates and from the following detailed description of the illustrated embodiment thereof made with reference to the accompanying drawings forming a part of this specification and in which similar reference numerals are employed to designate corresponding parts throughout the several views, and in which:

FIG. 6 is a schematic circuit diagram usable with the speed control apparatus shown in FIG. 1.

The present invention provides a novel control apparatus, and more particularly provides a novel speed control apparatus for an automotive vehicle and which includes a selectively, electrically actuatable speed governor unit 10 for controlling the position of an engine throttle member 14 to control the speed of the vehicle. As representing one embodiment of the present invention, FIG. 1 of the drawings schematically shows a speed control apparatus A for controlling the position and movement of the engine throttle member 14.

Figure 1:
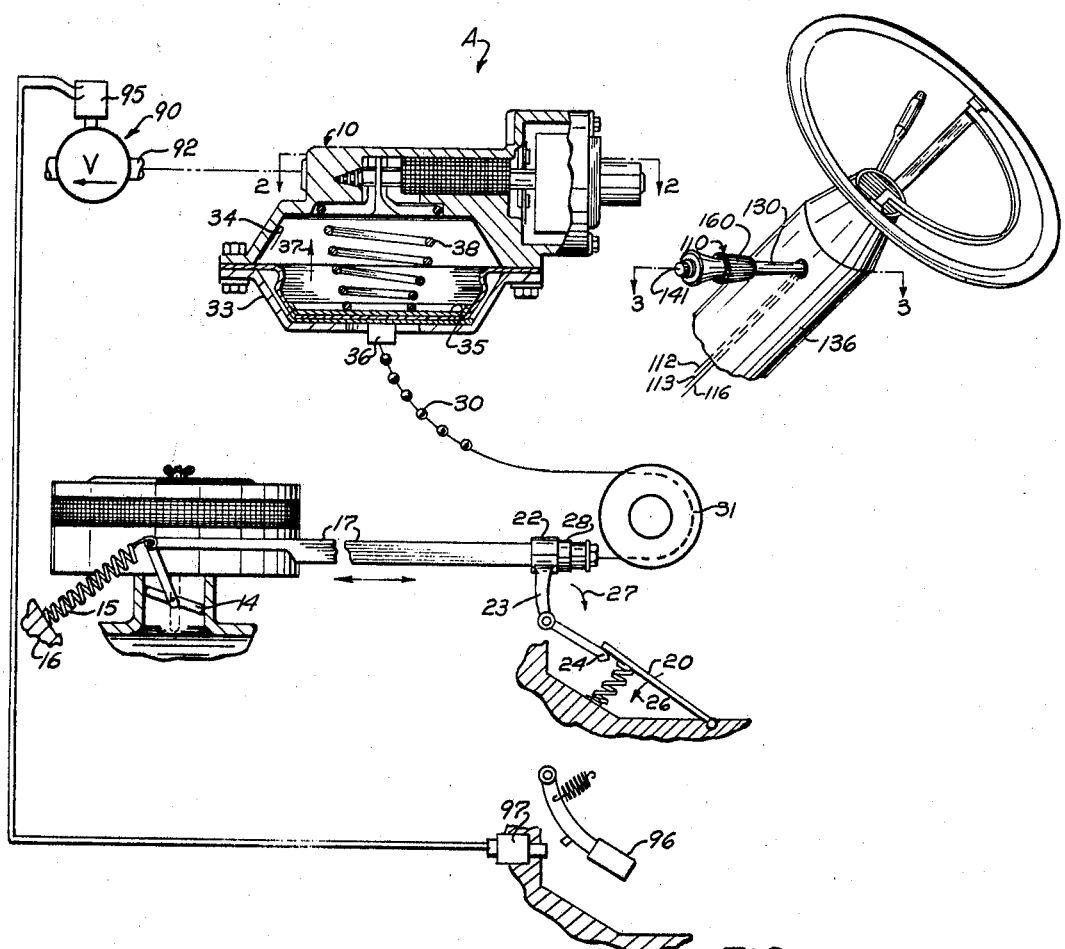
FIG. 1 is a schematic view illustrating a speed control apparatus embodying the present invention.

The engine throttle control member 14 is movable from a closed position, as shown by the full lines in FIG. 1, to a fully open position, as shown by the dotted lines in FIG. 1, in a throttle opening direction for increasing the vehicle speed and is movable in the reverse direction toward a closed position for decreasing the vehicle speed. The throttle member 14 is biased towards its closed position by a spring 15, one end of which engages a suitable fixed support member 16 and the other end of which engages one end of a rod 17 which is connected to the throttle member 14. The rod 17 is connected to the throttle member 14 so as to effect movement of the throttle member 14 between its positions upon linear movement thereof. As viewed in FIG. 1, when the rod 17 moves toward the right, the throttle member 14 moves in its throttle opening direction and when the rod member 17 moves toward the left, the throttle member 14 moves in a throttle closing direction.

The rod 17, as noted above, is biased by the spring 15 toward the left and is moved toward the right upon depression of an accelerator pedal 20 of the automotive vehicle. To this end, the rod 17 is slidably connected to one end 22 of a bell-crank lever 23 which in turn is pivotally connected intermediate its ends to a fixed support on the automotive vehicle. The other end 24 of the bell-crank lever 23 is disposed beneath the upper end of the accelerator pedal 20, as viewed in FIG. 1. When the accelerator pedal 20 is depressed, i.e., moved in the direction of the arrow 26, it engages the end 24 of the bell-crank lever and causes the same to be pivoted in the direction of the arrow 27. Movement of the bell-crank lever in this direction causes the upper end 22 thereof to engage an abutment 28 fixed to the rod 17 to cause the rod 17 to be moved toward the right and the throttle member 14 to be moved in a throttle opening direction.

The throttle member 14 may also be moved in its throttle opening direction by means of the speed governor unit 10 which is operatively connected with the rod 17, such as by means of a flexible chain like member 30 trained around a pulley 31, as shown in FIG. 1. The speed governor unit 10 can be of any suitable type which is electrically actuated, but is preferably an electrically actuatable vacuum speed governor unit like that disclosed in application Ser. No. 453,750, filed Mar. 6, 1965, now Patent No. 3,298,482, and assigned to the same assignee as the present invention. Since the speed governor unit 10 does not per se form a part of the present invention, it will not be described in detail, but will only be described to the extent necessary for one skilled in the art to understand its general operation and its operational relationship with the speed control apparatus of the present invention.

The speed governor unit 10 includes a housing 33 which defines in part a vacuum chamber 34 and supports a flexible diaphragm 35, which forms a wall of the vacuum chamber 34. The diaphragm 35 is connected by means of a suitable clip 36 to the end of the chain-like member 30 opposite its end which is connected to the rod 17. Movement of the flexible diaphragm 35 in a direction of the arrow 37, shown in FIG. 1, is in a direction to effect movement of the rod 17 toward the right, as viewed in FIG. 1, through the chain-like connection 31 and movement of the throttle member 14 in a throttle opening direction.

The diaphragm 35 is movable in the direction of the arrow 37 shown in FIG. 1 in response to the creation of a vacuum in the vacuum chamber 34 and is biased to the position shown in FIG. 1 by means of a suitable spring 38 and the spring 15. When the vacuum in the vacuum chamber 34 and the force applied by the springs 38 and 15 are balanced, the diaphragm 35 stops moving and an equilibrium condition is established. When the vacuum is either increased or decreased the diaphragm 35 will move and cause a consequent movement of the throttle member 14.

The vacuum in the vacuum chamber 34 is provided through a suitable vacuum connection 40 in the housing 33 which in turn is connected by a suitable conduit (not shown) to the intake manifold of the vehicle to supply a vacuum thereat. The chamber 34 also is in communication with the atmosphere through a suitable connection 41 spaced slightly from the connection 40 and opposite thereto.

The vacuum in the chamber 34 is controlled by a flapper valve or member 42 which controls the amount of communication between the vacuum and atmospheric connections 40, 41 and the vacuum chamber 34. The flapper valve 42 extends between nozzle-like openings 43 and 44 respectively connecting the vacuum and atmospheric conduits 40 and 41 with a chamber 34. The flapper valve 42 is movable relative to the nozzles 43 and 44 and when positioned adjacent the nozzle opening 43 substantially blocks communication between the vacuum conduit 40 and the vacuum chamber 34 and thus, the chamber 34 is at substantially atmospheric pressure and the diaphragm 35 is in the position shown in FIG. 1. When the flapper valve 42 moves away from the nozzle 43, the vacuum connection 40 is in communication with the chamber 34 and a vacuum is established therein causing the diaphragm member 35 to move in a direction of the arrow 37 shown in FIG. 1. The flapper valve 42 specifically is a flat strip member which extends between the adjacent nozzle openings 43 and 44, respectively, and is biased by a suitable leaf spring 47 into engagement with the nozzle 43, thereby blocking communication between the vacuum connection 40 and the vacuum chamber 34.

Figure 2:
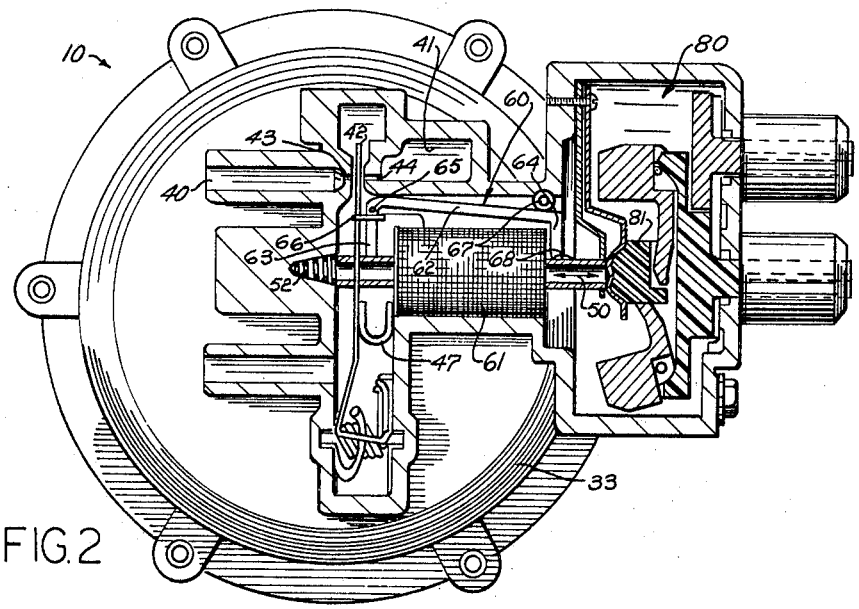
FIG. 2 is an enlarged sectional view of part of the speed control apparatus shown in FIG. 1 and taken approximately along line 2—2 of FIG. 1.

The flapper valve 42 is moved toward the right and left, as viewed in FIG. 2, when the speed governor unit 10 is actuated, in response to a decrease and an increase in vehicle speed from the desired speed, respectively. When the flapper valve 42 is moved toward the right, an increased vacuum is created in the vacuum chamber 34, the increase being in accordance with the amount of movement of the flapper valve 42. This causes movement of the diaphragm 35 in the throttle opening direction, as indicated by the direction of the arrow 37 in FIG. 1, to hold the vehicle speed near the desired speed. When the flapper valve is moved toward the left, the degree of vacuum in the vacuum chamber 34 is decreased, since communication between the vacuum chamber 34 and the atmospheric connection 41 is increased. This causes the springs 38 and 15 to move the diaphragm 35 in a throttle closing direction (in a direction opposite to the direction of the arrow 37 in FIG. 1) to hold the vehicle near the desired speed.

Movement of the flapper valve 42 toward the right and left, as viewed in FIG. 1, is effected in response to movement of a core member 50, which moves right and left, in response to changes in vehicle speed. The core member 50 moves toward the left upon an increase in the vehicle speed and moves toward the right upon a decrease in the vehicle speed, and in a manner hereinafter more fully described. The left end of the core member 50, as viewed in FIG. 1, is slidably received through an opening in the flapper valve 42. A suitable spring member 52 is supported in the housing 33 and engages the left end of the core member 50 and biases the core member 50 toward the right.

The speed governor unit 10 includes a locking mechanism 60 for locking the core member 50 to the flapper valve 42 to cause these members to move together so that as the core member 50 moves in response to vehicle speed, the flapper valve 42 likewise moves. The locking mechanism 60 includes an electrical coil 61 which is positioned so as to encircle the core member 50 and a locking bracket or link 62 which straddles the coil member 61 end-to-end and which is engageable with the core member 50 at the opposite ends of the coil 61. The bracket or link member 62 is U-shaped and the legs 63 and 64 thereof are positioned at the opposite ends of the coil 61 and the extreme ends of the legs 63 and 64 engage the core member 50 when the coil 61 is energized.

The leg 63 of the link 62 intermediate its end is pivotally supported by a cross pin 65 carried by the flapper valve 42. A flexible and resilient connection in the form of a bifurcated spring wire member 66 couples the leg 63 of the link member 62 resiliently to the flapper valve 42. The spring wire 66 functions to bias the link member 62 counterlockwise, as viewed in FIG. 2, against an adjustable and eccentric stop 67.

In order to lock the core member 50 to the flapper valve 42, the coil 61 is energized which causes movement of the link 62 by magnetic attraction in a clockwise direction, as viewed in FIG. 2, from the position shown in FIG. 2. Because of the construction and arrangement of the flapper valve 42, core 50, and the link 62, when the coil 61 is energized, the lower end of the leg 63 of the link 62 first locks to the core member 50 and becomes a temporary fulcrum for the link 62, and the flapper valve 42 and link 62 pivot as a unit. The flapper valve 42 due to the pivoting movement moves from contact with the nozzle 43, and, as will be described in detail hereinbelow, moves to a position located at a distance from the nozzles 43, 44 to have the appropriate vacuum applied to the chamber to hold the throttle member 14 in its desired position to maintain the desired speed. The link 62 then pivots about the pivot pin 65 carried by the flapper valve 42, with its opposite leg 64 moving down to the core 50 to lock the latter to the flapper valve 42. From the foregoing, it should be apparent that the core member 50 and the flapper valve 42 are locked together on energization of the coil 61.

When the coil 61 is de-energized, the spring wire 66 tends to return the link 62 to the position shown in FIG. 2. A suitable leaf spring 68 carried by the core 50 and engageable with the lower end of the leg 64 of the link can be provided to assist and move the link 62 from the locking position back to the position shown in FIG. 2. The spring 68, however, does not interfere with the locking of the link 62 to the core 50.

As already pointed out, the vacuum in the vacuum chamber 34 is controlled, when the electrical coil 61 is energized, by movement of the flapper valve 42 relative to the vacuum nozzle 43 upon movement of the core member 50. The core member 50 is moved in response to increases and decreases in the speed of the vehicle by means of a vehicle speed sensing means or mechanism, generally designated by reference numeral 80. The speed sensing mechanism 80 can be of any suitable or conventional construction, but it preferably the type disclosed in the aforementioned U.S. application Ser. No. 453,750. Since the speed sensing mechanism 80 does not per se form a part of the present invention, it will not be described in detail. Suffice it to say that the speed sensing mechanism 80 is operatively connected with the vehicle drive and includes a movable abutment 81 which is located directly opposite the right end of the core 50, as viewed in FIG. 2, and which is movable toward the left and right in response to an increase and decrease in the speed of the vehicle, respectively. Suffice it further to say that the movable abutment engages the right end of the core member 50 to effect movement of the core member toward the left in response to an increase in the speed of the vehicle, and that the compression spring 52 effects movement of the core 50 toward the right when the abutment 81 moves toward the right in response to a decrease in the vehicle speed.

The speed governor unit 10 also includes an electrically actuated vacuum release valve means 90 (see FIG. 1) to render the speed governor unit 10 operable or inoperable to control the vehicle speed and independently of the electrically actuated locking mechanism 60. The vacuum release valve means 90 can be of any suitable or conventional construction, and since it does not per se form a part of the present invention it will not be described in detail. Suffice it to say that the release valve means 90 is in communication with the vacuum chamber 34 via a conduit 92 and that it includes a valve member (not shown) which is spring biased to an open position in which it communicates the vacuum chamber 34 to the atmosphere. Suffice it further to say that the valve member is movable from its open position to a closed position in which it prevents any venting of the vacuum chamber 34 to the atmosphere via the conduit 92 upon energization of a solenoid or coil 95 operatively connected therewith.

The solenoid coil 95 is adapted to be de-energized to vent the vacuum chamber 34 to the atmosphere upon depression of a brake pedal 96 to reduce the speed of the vehicle. To this end, a suitable switch 97 is provided on the vehicle and which is engageable by the brake pedal 96 upon the latter being depressed for controlling energization and deenergization of the solenoid coil 95. The switch 97 is actuated from a normally closed position to an open position in response to depression of the brake pedal 96 to reduce the speed of the vehicle. When the brake pedal 96 is depressed, the switch 97 is moved to an open position to deenergize the solenoid 95 of the release valve means 90 to cause the vacuum chamber 34 to be immediately vented to the atmosphere so as to render the speed governor unit 10 inoperative or ineffective to control the speed of the vehicle during braking. When the brake pedal is released, it returns to its normal position and the switch 97 is moved to its closed position to again energize the solenoid 95 of the release valve means 90 to cause the valve member thereof to block communication betwen the vacuum chamber 34 and the atmosphere. The valve means 90 also includes a pair of switch contacts 98, 99 (shown only in the schematic circuit diagram of FIG. 6) which are relatively movable between closed and open positions in response to movement of the valve member thereof between closed and open positions, respectively.

The operation of the speed control apparatus A thus far described will be more readily understood from a description of an electrical control diagram which may be embodied therein and which is schematically illustrated in FIG. 6. The electrical control diagram illustrated in FIG. 6 includes the previously described locking coil 61, the vacuum release coil 95, the switch contacts 98, 99 operated by the release coil 95 and the brake pedal switch 97. This control diagram also includes a battery 101, an ignition switch 102, a spring biased two-position speed set switch 105 and a spring biased two-position rotary speed resume switch 106.

The speed set switch 105 and the speed resume switch 106 are manually actuatable and are mounted on the turn signal lever 110 of the vehicle, and in a manner and for reasons which will hereinafter be more fully described.

When the operator of the vehicle turns the ignition switch 102 to its closed position to start the vehicle, a circuit for energizing the locking coil 61 is immediately completed from battery 101, wire 111, now closed ignition switch 102, wire 112, switch contact 105–1 of switch 105, speed set switch element 105 (which is normally in the solid line position shown in FIG. 6 in which it is engaged with switch contacts 105–1 and 105–2), switch contact 105–2 of switch 105, wire 113, locking coil 61, wire 114 to ground. The completion of this circuit energizes the locking coil 61 to cause the core member 50 to be locked to the flapper valve 42. It should be understood, however, that no speed control, as yet, can take place because the vacuum release coil 95 closing off communication between the vacuum chamber 34 and the atmosphere via conduit 92 has not as yet been energized.

When the vehicle is accelerated and it is desired to actuate the speed governor unit in order to maintain the vehicle at a predetermined or desired driving speed, the operator must manually operate the speed set switch 105 by depressing switch element 105a to move the latter from its solid line position to its dotted line position, as shown in FIG. 6. Movement of the switch element 105a to its dotted line position breaks the circuit for the locking coil 61 to deenergize the same and completes a circuit to energize the vacuum release coil 95. This circuit is from battery 101, wire 111, now closed ignition switch 102, wire 112, switch contact 105–3 of switch 105, speed set switch element 105a (which is now in the dotted line position shown in FIG. 6 in which it engages switch contacts 105–3 and 105–4), switch contact 105–4 of switch 105, wire 116, vacuum release coil 95, wire 117, normally closed brake switch 97, wire 118 to ground. Energization of the coil 95 causes the valve member of the vacuum release valve means 90 to be moved in opposition to the biasing force of its spring to a closed position to block communication between the vacuum chamber 34 and the atmosphere. Movement of the valve member of the vacuum release valve means 90 to its closed position also causes the switch contacts 98, 99 to be closed to complete a holding circuit for the coil 95 from battery 101, wire 111, now closed ignition switch 102, wire 112, now closed contacts 98, 99, wire 116, coil 95, wire 117, normally closed brake switch 97, wire 118 to ground.

When the operator releases the speed set switch element 105a of switch 105, it returns to its solid line position shown in FIG. 6, since it is spring biased to this position, to again complete the circuit for energizing the locking coil 61. Reenergization of the locking coil 61 causes the core to be locked to the flapper valve 42 so that the speed governor unit 10 now controls the position of the throttle member 14 to regulate the speed of the vehicle, and in a manner hereinbefore described. The coil 95 remains energized through the aforementioned holding circuit when the switch element 105a of switch 105 returns to its solid line position.

If the vehicle operator depresses the brake pedal 96, this will open the normally closed brake pedal switch 97 and thus, break the holding circuit for the release coil 95. The breaking of this holding circuit will cause the coil 95 to be deenergized and the release valve means 90 to be moved to its open position and thereby communicate the vacuum chamber 34 of the speed governor unit 10 to the atmosphere and render the speed governor unit 10 inoperative to control the vehicle speed.

If the operator releases the brake pedal 96 and desires to reactuate the speed governor unit 10 and reestablish control over the vehicle speed at the desired value, he will operate the speed resume switch 106 by rotating switch element 106a thereof to move the same from its solid line position to its dotted line position shown in FIG. 6 to complete a circuit for reenergizing the coil 95. This circuit is from battery 101, wire 111, now closed ignition switch 102, wire 112, switch contact 106-1 of switch 106, switch element 106a, switch contact 106-2 of switch 106, wire 116, coil 95, wire 117, now closed brake switch 97 (since the brake pedal has been returned to its normal position), wire 118 to ground. The reenergization of the coil 95 will again block communication between the vacuum chamber 34 and the atmosphere and again close contacts 98, 99 to complete the holding circuit for the coil 95 so that when the speed resume switch is released and returns to its solid line position shown in FIG. 6 the coil 95 remains energized due to the aforementioned holding circuit. Since the locking coil 61 was not deenergized during the braking operation, the speed governor unit 10 will be effective to again maintain the speed of the vehicle at the desired value.

In accordance with the provisions of the present invention, the speed set switch 105 and the speed resume switch 106 are mounted on the turn signal lever 110 of the automotive vehicle. By mounting the switches 105 and 106 on the turn signal lever 110, they can be readily operated by the operator of the vehicle without the operator looking to see where the switches are. Moreover, by mounting the switches 105, 106 on the turn signal lever 110, they are not only mounted in a convenient location, but do not clutter up the dashboard.

The turn signal lever 110 comprises a hollow metal rod or tube 130 and a hollow housing or tubular support member 132, preferably made from a plastic material, which is press fitted or otherwise suitably secured to one end 133 of the metallic tube 130. The other end of the tube 130 is mounted or secured to a rotatable member (not shown) which is carried by a steering column 136 of the automotive vehicle and which operates the turn signal lights of the automotive vehicle, and in a conventional manner well known in the art. The tube 130 and the hollow housing 132 have aligned axially extending through openings 137, 138 therethrough.

Figure 3:
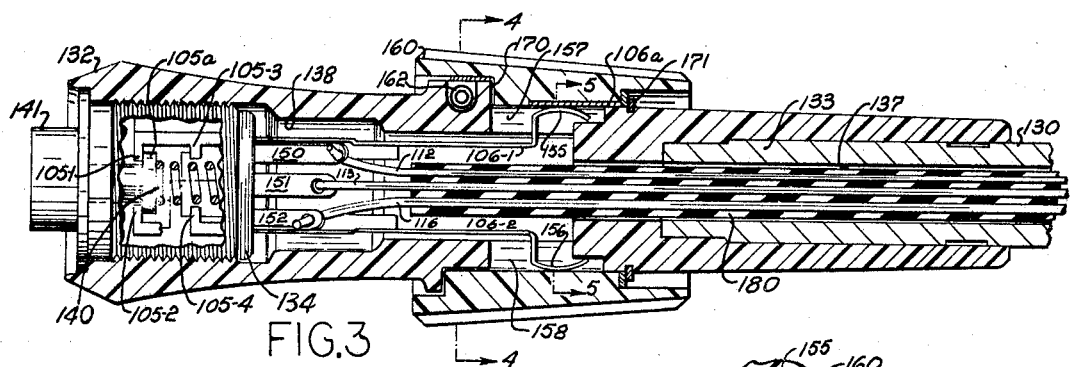
FIG. 3 is an enlarged axial cross sectional view of another part of the speed control apparatus shown in FIG. 1 and taken approximately along line 3—3 thereof.

The speed set switch means 105 includes a switch housing 134 which is suitably mounted in the end of the hollow support housing 132 remote from the steering column 136. The switch 105 is a manually actuatable two-position push button switch which can be of any suitable or conventional construction, and since the switch 105 does not per se form a part of the present invention, it will not be described in detail. Suffice it to say that the push button switch 105, as schematically shown in FIG. 3, comprises the switch element 105a which is movable from a first position, as shown in the solid lines in FIG. 3, in which it engages contacts 105-1 and 105-2 to connect wires or electrical conductors 112 and 113 and a second position in which it engages contacts 105-3 and 105-4 to connect wires or electrical conductors 112 and 116. The switch element 105a is biased to its first position by a compression spring 140 and is movable from its first position to its second position in opposition to the biasing force of the spring by depressing a push button 141 connected to the stem of the switch element 105a. Suffice it further to say that the switch 105 includes three metal conducting prongs 150, 151 and 152 which project axially in the opening 138 of the housing 132. The prong 150 carries at spaced locations the contacts 105-1 and 105-3 and the prongs 151 and 152 carry contacts 105-2 and 105-4, respectively. The prongs 150-152 at their free end in the housing 132 are respectively operatively connected to the wires or electrical conductors 112, 113 and 116, which wires extend through the openings 137, 138 of the tube 130 and tubular housing 132.

From the foregoing, it should be apparent that when the push button element 105a is depressed against the biasing force of the spring 140 and moved from its first position to its second position the switch element 105a disengages contacts 105-1 and 105-2 to break the hereinbefore described circuit for the coil 61 to deenergize the same and engages contacts 105-3 and 105-4 to complete a circuit for the vacuum release coil 95 to energize the same. When the push button element 105a is released, the spring 140 will return it to its first position in which it reengages contacts 105-1 and 105-2 to complete the circuit for the coil 61 to energize the same.

The speed resume switch means 106 is also mounted on the support housing 132 of the turn signal level 110. The switch means 106 comprises the switch contacts 106-1 and 106-2 which are fixed contacts. The fixed contacts 106-1 and 106-2 are disposed within the opening 138 and are in the form of resilient spring fingers having one end suitably secured to the prong contact 150 and 152, respectively. The spring fingers 106-1 and 106-2 at their other end have radially extending portions 155, 156 provided with curved ends which extend through a pair of circumferentially spaced radially extending through openings 157, 158 in the housing 132. The switch element 106a of speed resume switch 106 is a circumferentially extending mobile contact fixed to an inner side wall of a rotatable collar or member 160 rotatably supported on the housing 132 intermediate its ends. The circumferentially extending switch element 106a overlies the fixed radially extending portion 155 of the fixed contacts 106-1 and is in constant engagement therewith.

The collar 160 is rotatable relative to the support housing 132 between a first position in which said circumferentially extending switch element 106a is in engagement wth the switch contact 106-1 but not in engagement with the switch contact 106-2 and a second position in which the switch element 106a is in engagement with both of the fixed contacts 106-1 and 106-2 to complete the electric circuit for energizing the vacuum release coil 95.

Figure 4:
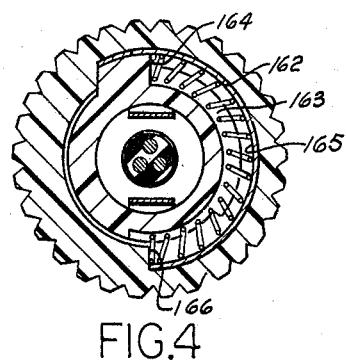
FIG. 4 is an enlarged sectional view taken approximately along line 4—4 of FIG. 3.
Figure 5:
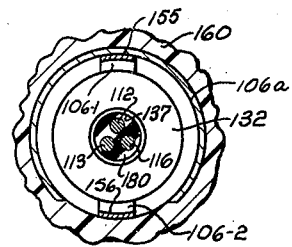
FIG. 5 is an enlarged sectional view taken approximately along line 5—5 of FIG. 3.

As best shown in FIG. 4, the collar 160 is adapted to be spring biased toward its first position by a spring biasing means in the form of a compression spring 162. To this end, the annular support housing 132 has a circumferentially extending groove 163 therein provided with a radial extending abutment surface 164 at one end and the collar 160 has an internal circumferentially extending groove 165 therein provided with a radially inwardly extending abutment surface 166 at one end. The spring is a coiled compression spring having one end in abutting engagement with the abutment surface 164 and the other end in abutting engagement with the abutment surface 166 and functions to bias the collar 160 to its first position relative to the housing 132. A suitable circumferentially extending wear strip 169 carried by the bottom of the internal groove and the collar 160 can be provided to enable the collar 160 to be rotated relative to the housing 132 without binding or catching on the spring 162.

The collar 160 is mounted on the housing 132 so as to provide for relative circumferential movement but not relative axial movement. To this end, the collar is positioned between a radially extending abutment surface 170 at the left end of the housing, as viewed in FIG. 3, and by a suitable retainer ring 171 disposed in an external groove in the housing 132 and which engages the right end of the collar 160 to prevent the latter from shifting axially relative to the housing 132.

From the foregoing, it should be apparent that the speed resume switch is operated by rotating the collar 160 from its first position toward its second position in which the circumferentially extending switch element 106a carried thereby is in contact with both of the fixed switch contacts 106-1 and 106-2 to complete a circuit for energizing the vacuum release coil 95, and is returned to its first positions by the biasing force of the spring 162 when the collar 160 is released.

The electrical conductors or wires 112, 113, 116 extends through the openings 137 and 138 of the hollow turn signal lever 110 and are disposed within a suitable sheath 180 made from a dielectric material to insulate the same from the turn signal lever 130. The conductors extending through the turn signal lever 110 also are adapted to extend through the hollow steering column of the automotive vehicle and are suitably connected with the vacuum release coil 95 and the locking coil 61, as schematically shown in FIG. 6.

Although the turn signal lever and switch construction heretofore described are used for actuating electrical coils or controls for a speed governor unit, it will of course be understood, that these switches could be used to actuate other electrically actuated devices on the automotive vehicle, or could be used for actuating any suitable electrically operated devices.

From the foregoing description of the illustrated embodiment of the present invention, it will be apparent that the objects heretofore enumerated and others have been accomplished and that a new and improved speed control apparatus has been provided. Also from the above description, it should be readily apparent that the speed control apparatus embodying the present invention has been described in considerable detail and that certain changes, modifications and adaptations may be made therein by those skilled in the art to which it relates.

Having described our invention, we claim:

1. A speed control apparatus for controlling the position of a vehicle speed control member which is movable in opposite directions to control the speed of the vehicle, and which apparatus comprises a speed governor unit operatively connected with said control member, said speed governor unit including a first electrically actuatable control means for rendering said speed governor unit operable to control the position of said control member to maintain said vehicle at a desired speed when said control means is actuated, a turn signal lever, first manually operable switch means mounted on said turn signal lever and in an electric circuit with said electrically actuatable control means to control actuation of the latter, second electrically actuatable control means operatively associated with said speed governor unit and being selectively actuatable to render said speed governor unit effective to control the position of said control member independent of said first control means, and second manually operable switch means mounted on said turn signal lever and in an electric circuit with said second control means to control actuation of the latter.

2. A speed control apparatus, as defined in claim 1, and wherein one of said switch means is a push button switch mounted on said turn signal lever at its free end, and wherein the other of said switch means is a rotary switch carried by said turn signal lever and located intermediate the ends of said turn signal lever.

3. A speed control apparatus as defined in claim 2 and wherein said other switch means comprises a pair of fixed contacts carried by said turn signal lever, a collar rotatably mounted on said turn signal lever and having a switch element mounted on its inner wall adjacent said fixed switch contacts, said collar being rotatable to move said switch element between a first position in which it does not engage both of said fixed contacts and a second position in which it engages both of said fixed contacts to complete a circuit and actuate said second control means.

4. A speed control apparatus as defined in claim 2, and wherein said turn signal lever is a tubular member having a central opening and electrical conductors connected with said first and second switch means form said circuits and extend through said opening in said member.

5. An apparatus for controlling actuation of first and second electrical control means of an automotive vehicle comprising a hollow turn signal lever which is adapted to be mounted on a steering column of the vehicle, first manually operable switch means mounted on said turn signal lever for controlling actuation of said first electrical control means, second manually operable switch means mounted on said turn signal lever for controlling actuation of said second electrical control means, first electrical conductors operatively connected with said first switch means and which are adapted to be connected with said first electrical control means to form an electric circuit, second electrical conductors operatively connected with said second switch means and which are adapted to be connected with said second control means to form an electric circuit, all of said electrical conductors extending through said hollow turn signal lever.

6. An apparatus, as defined in claim 5, and wherein said first electrical control means controls actuation and deactuation of a speed governor unit for an automotive vehicle.

7. An apparatus for use in controlling energization and deenergization of an electrical device comprising a hollow support member, first and second circumferentially spaced fixed switch contacts carried by said support member, electrical conductors extending through said hollow support member and having one end thereof operatively connected with respective ones of said first and second switch contacts and being adapted to be connected with said electrical device at their other end, a collar rotatably supported on said hollow support member and having a circumferentially extending switch contact mounted on its inner wall adjacent said fixed switch contacts, said collor being rotatable relative to said support member between a first position in which said circumferentially extending switch contact does not engage both of said spaced fixed contacts and a second position in which said circumferentially extending switch contact engages both of said fixed switch contacts to complete an electrical circuit with said electrical device to energize the same, and biasing means engageable with said collar and said hollow support member for biasing said collar toward one of said positions.

8. An apparatus for use in controlling energization and deenergization of an electrical device comprising a hollow support member, first and second circumferentially spaced fixed switch contacts carried by said support member, electrical conductors extending through said hollow support member and having one end thereof operatively connected with respective ones of said first and second switch contacts and being adapted to be connected with said electrical device at their other end, a collar rotatably supported on said hollow support member and having a circumferentially extending switch contact mounted on its inner wall adjacent said fixed switch contacts, said collar being rotatable relative to said support member between a first position in which said circumferentially extending switch contact does not engage both of said spaced fixed contacts and a second position in which said circumferentially extending switch contact engages both of said fixed switch contacts to complete an electric circuit with said electrical device to energize the same, said hollow support housing having a pair of circumferentially spaced radial openings therethrough, and wherein said fixed switch contacts are resilient fingers having free end portions projecting through said radial opening and which are engageable with said circumferentially extending switch element on said collar.

9. An apparatus for use in controlling energization and deenergization of an electrical device comprising a hollow support member, first and second circumferentially spaced fixed switch contacts carried by said support member, electrical conductors extending through said hollow support member and having one end thereof operatively connected with respective ones of said first and second switch contacts and being adapted to be connected with said electrical device at their other end, a collar rotatably supported on said hollow support member and having a circumferentially extending switch contact mounted on its inner wall adjacent said fixed switch contacts, said collar being rotatable relative to said support member between a first position in which said circumferentially extending switch contact does not engage both of said spaced fixed contacts and a second position in which said circumferentially extending switch contact engages both of said fixed switch contacts to complete an electric circuit with said electrical device to energize the same, said support member having an external circumferentially extending groove provided with a radially extending abutment surface at one end, and wherein said rotatable collar has an internal circumferentially extending groove overlying said groove in said support member and which is provided with a radial abutment surface at one end, and a compression spring having one end in abutting engagement with said abutment on said support member and the other end in abutting engagement with said abutment on said collar for biasing said collar toward its first position.

10. A speed control apparatus for controlling the position of an automotive vehicle throttle member which is movable in opposite directions between closed and open positions to control the speed of the vehicle and which apparatus comprises a speed governor unit operatively connected with said throttle member and operable to maintain the speed of the vehicle substantially at a desired value, a lever adapted to be movably mounted on a steering column of the vehicle, first manually operable switch means mounted on said lever and selectively operable to render said speed governor unit effective to maintain the speed of the vehicle at the desired value, means for rendering said speed governor unit ineffective to maintain the speed of the vehicle at the desired value in response to a predetermined operating condition of the vehicle, and second manually operable switch means mounted on said lever for again rendering said speed governor unit effective to maintain the speed of the vehicle at the desired value after operation of said means for rendering said speed governor unit ineffective to maintain the speed of the vehicle at the desired value.

11. A speed control apparatus, as defined in claim 10, and wherein one of said switch means includes a pushbutton switch mounted on said lever at its free end.

12. A speed control apparatus, as defined in claim 10, and wherein the one of said switch means includes a rotary switch carried by said lever and located intermediate the ends of said lever.

13. A speed control apparatus for controlling the position of an automotive vehicle engine throttle member which is movable in opposite directions between closed and open positions to control the speed of the vehicle and which apparatus comprises a speed governor unit operatively connected with the throttle member and operable to control the position of the throttle member, said speed governor unit including vacuum chamber means operatively connected with said throttle member for moving said throttle member in response to variations in fluid pressure in said vacuum chamber means, valve means operable to vary the fluid pressure in said vacuum chamber means, a movable member, means for moving said member in response to changes in vehicle speed, lock means for selectively securing said member to said valve means to thereby operate said valve means upon movement of said member to vary the fluid pressure in said vacuum chamber means as a function of changes in vehicle speed and for releasing said member for movement independently of said valve means, and an electromagnetic coil which is operable to actuate said lock means and connect said member to said valve means to set the speed governor unit to maintain the vehicle at a desired speed, a tubular turn signal lever carried by the steering column of the vehicle, manually operable switch means mounted on said turn signal lever at its free end remote from the steering column, electrical conductors extending through said tubular turn signal lever and connecting said switch means in electrical communication with said electromagnetic coil in said speed governor unit, said switch means being selectively operable to complete an electrical circuit to energize said electromagnetic coil to thereby render said speed governor unit effective to maintain the speed of the vehicle at the desired speed.

References Cited

UNITED STATES PATENTS

| | | | |
|---|---|---|---|
| 2,519,726 | 8/1950 | Wollard | 200—157 |
| 2,557,887 | 6/1951 | Nolan | 200—61.54 |
| 2,558,083 | 6/1951 | Green | 200—157 X |
| 3,088,538 | 5/1963 | Brennan et al. | 180—108 |
| 3,183,994 | 5/1965 | Goerke et al. | 180—108 |
| 3,249,176 | 5/1966 | Dangler et al. | 180—109 |
| 3,300,612 | 1/1967 | Quayle | 200—157 |
| 3,334,201 | 8/1967 | Mutschler et al. | 200—61.54 |

KENNETH H. BETTS, Primary Examiner

U.S. Cl. X.R.

123—102; 200—155, 61.54

Disclaimer 3,481,422.—*Robert S. Mueller*, Southfield and *Martin W. Uitvlugt*, Battlecreek, Mich. SPEED CONTROL APPARATUS FOR AN AUTOMOTIVE VEHICLE. Patent dated Dec. 2, 1969. Disclaimer filed Sept. 3, 1981, by the assignee, *Eaton Corp.*

Hereby enters this disclaimer to claims 1 through 13 of said patent.

[*Official Gazette November 17, 1981.*]